Jan. 29, 1924.

E. H. WHEELER 1,482,280

AUTOMOBILE SHOCK ABSORBER

Filed Feb. 1, 1923        2 Sheets-Sheet 1

Inventor
Edgar H. Wheeler
by his Attorneys,
Weed & Gray

Jan. 29, 1924. 1,482,280
E. H. WHEELER
AUTOMOBILE SHOCK ABSORBER
Filed Feb. 1, 1923 2 Sheets-Sheet 2

Inventor
Edgar H. Wheeler
by his Attorneys, Wead & Gray

Patented Jan. 29, 1924.

1,482,280

UNITED STATES PATENT OFFICE.

EDGAR H. WHEELER, OF FRANKLIN, NEW HAMPSHIRE, ASSIGNOR OF ONE-HALF TO EDWIN G. MOREY, OF WINDSOR, VERMONT.

AUTOMOBILE SHOCK ABSORBER.

Application filed February 1, 1923. Serial No. 616,260.

*To all whom it may concern:*

Be it known that I, EDGAR H. WHEELER, a citizen of the United States, residing at Franklin, in the county of Merrimack and State of New Hampshire, have invented certain new and useful Improvements in Automobile Shock Absorbers, of which the following is a specification.

This invention relates to hydraulic or fluid operating shock absorbers particularly adapted for the purpose of checking or cushioning the rebound or recoil of vehicle springs, and relates specially to a shock absorber for automobiles, an object of the invention being to provide an improved device of this character wherein the shocks are absorbed by a piston operating against a body of fluid in a cylinder or chamber, the construction being such that the working cylinder or chamber is positively filled or supplied with fluid upon the return stroke of the piston and without depending upon suction.

A further object of this invention is to provide an improved shock absorber or cushioning device for vehicles having a pair of pistons operating within a pair of fluid containing cylinders, one or each of the pistons operating at one stroke thereof to force fluid into the other cylinder during a predetermined stroke of the other piston therein. By virtue of this construction a positive and effective method is provided for filling the working cylinder during the return stroke of the working piston, and without the possibility of any valves not working properly at all times.

A further object of this invention is to provide a shock absorber especially adapted for connection between a pair of relatively movable parts of a vehicle, such as an automobile, and wherein a pair of pistons operate in a pair of fluid carrying cylinders against the same body of fluid, and wherein by means of valve mechanism between the cylinders greater resistance is offered to the working stroke of one piston than the other.

A further object of this invention is to provide an improved shock absorber or the like for vehicles which will be relatively cheap and simple in construction, simple and positive in operation, efficient and durable in use; the organization being such that the entire mechanism will operate properly and efficiently at all times.

Figure 1:
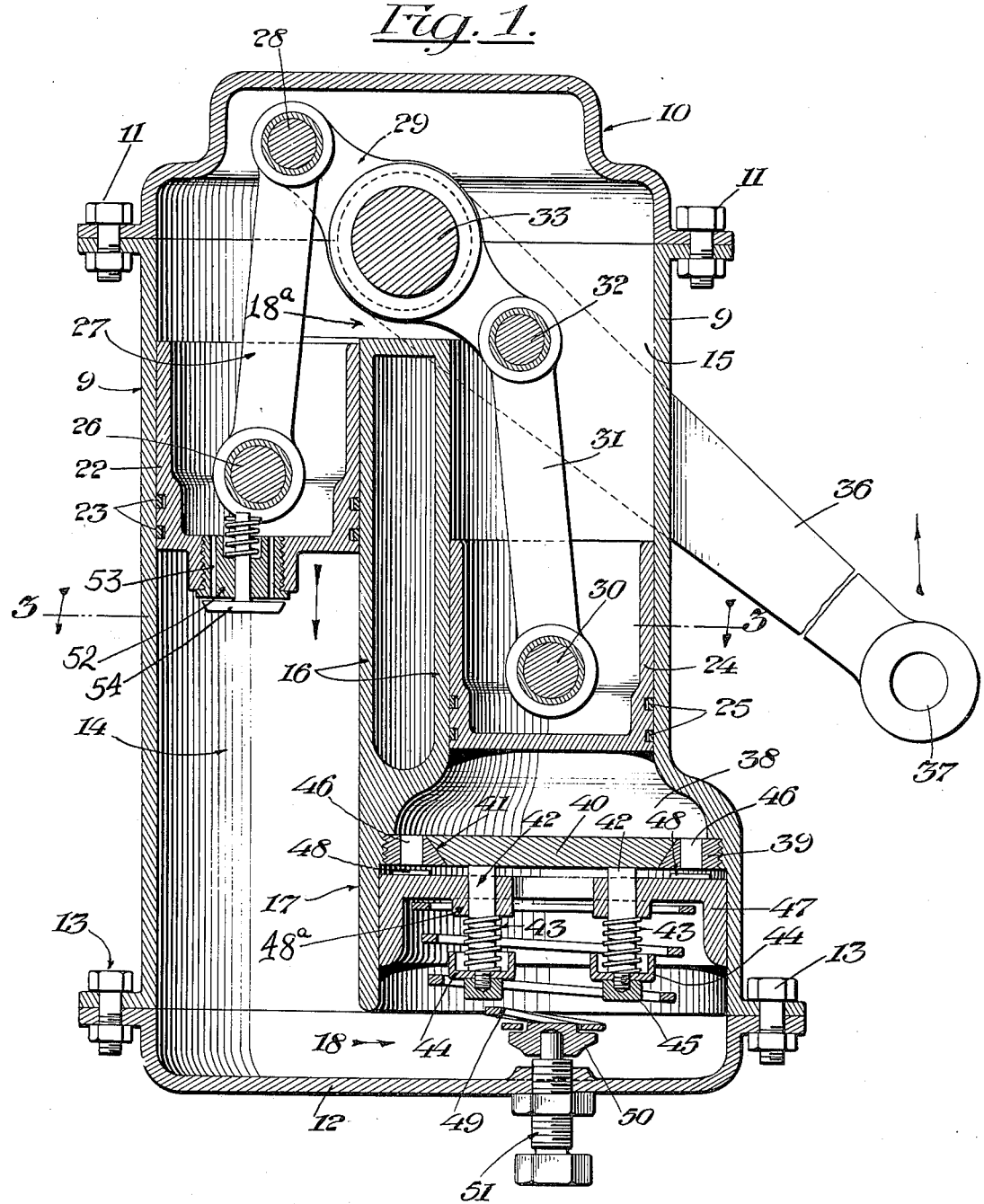
Figure 2:
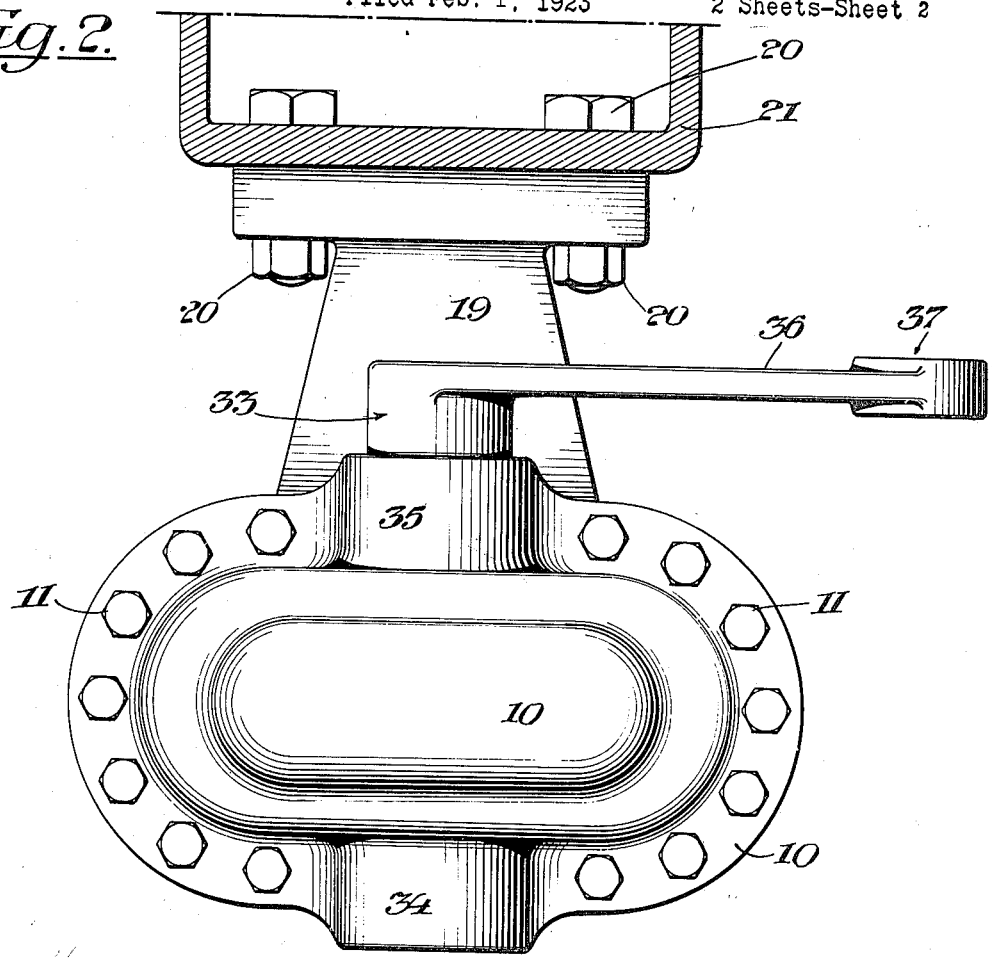
Figure 3:
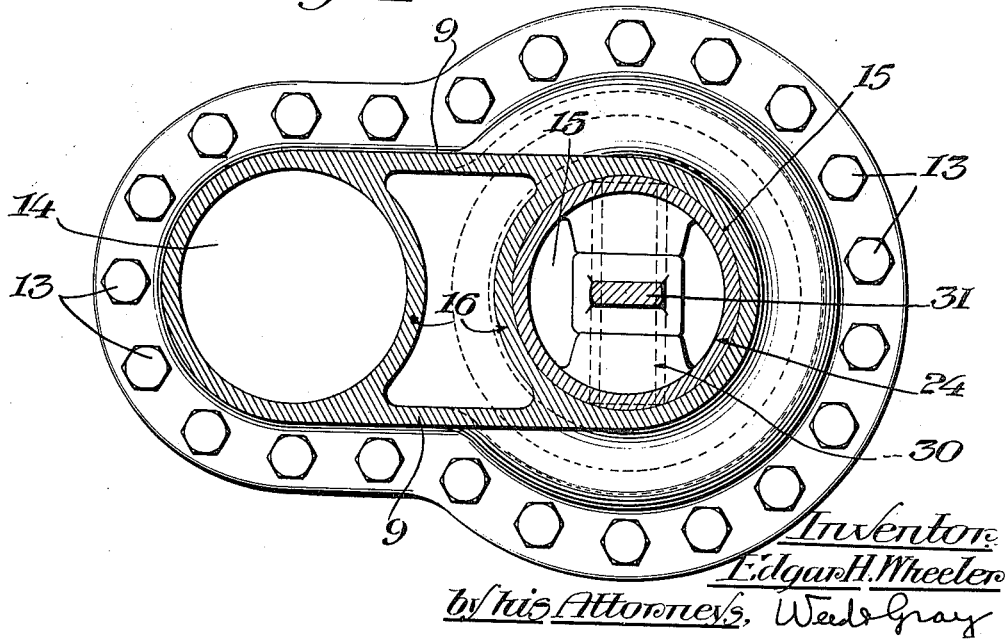

Other objects of this invention will appear in the following description thereof, reference being had to the accompanying drawings forming a part of this specification, wherein like reference characters indicate corresponding parts in the several views, and wherein Fig. 1 is a vertical section illustrating my invention; Fig. 2 is a top plan view thereof; and Fig. 3 is a cross section taken substantially on line 3—3 of Fig. 1.

Before explaining in detail the present improvement and mode of operation thereof, I desire to have it understood that the invention is not limited to the details of construction and arrangement of parts which are illustrated in the accompanying drawings, since the invention is capable of other embodiments, and that the phraseology which I employ is for the purpose of description and not of limitation.

The present invention embodies in general a pair of fluid containing cylinders communicating with each other and having a pair of reciprocating pistons in the cylinders which are submerged in the fluid, the cylinders being so separated by valve mechanism as to cause the same body of fluid against which each piston works to exert greater resistance to the reciprocation of one piston than the other piston. The pistons are preferably connected together and to a rock shaft which is connected to the axle of the vehicle, the cylinders being connected to the chassis of the vehicle, so that all shocks to the vehicle will be absorbed and cushioned by the mechanism.

Referring to the drawings wherein I have illustrated a preferred embodiment of my invention, a suitable casing 9 is provided having a cover plate 10 bolted thereto as at 11 and also having a base plate 12 bolted thereto as at 13. The casing is constructed to form a pair of cylinders 14 and 15, these being separated by means of a partition or wall 16 which terminates short of the top and bottom of the casing so as to form an upper passage 18ª and a lower passage 18 between the cylinders. The casing is also provided with an extension 19 by means of which the device is bolted at 20 to the vehicle chassis 21.

Within the cylinder 14 operates a suitable piston 22 provided with the usual piston rings 23, and within the cylinder 15 operates a piston 24 having suitable piston rings 25. The piston 22 is pivotally connected by means of a pin 26 to a piston rod 27 which is pivoted to a rocker arm 29 by means of a suitable pivot pin 28. In like manner, the piston 24 is pivotally connected by means of a pin 30 to a piston rod 31 which is connected to the rocker arm 29 by a pivot pin 32. The rocker arm 29 is secured to a rock shaft 33 mounted in bearings 34 and 35 in the upper part of the casing. Secured to the shaft 33 is an arm or link 36 having a ball and socket connection with the axle (not shown) of the vehicle.

The lower portion 17 of the wall 16 forms with the casing 9 a chamber 38 located below the cylinder 15. Within this chamber is mounted suitable valve mechanism for controlling the flow of fluid in opposite directions caused by the opposite reciprocations of the pistons 22 and 24. A bushing 39 is screwed into the walls of the chamber 38 and is provided with inwardly tapered valve seat 41 for a relatively large intake valve 40. The valve 40 is normally closed upon the valve seat 41 by means of pins 42 secured thereto having coil springs 43 embracing the same and seated in valve spring retainers 44, the pins 42 being secured thereto and to stop nuts 45. The bushing 39 is provided with a plurality of holes 46 forming exhaust ports, these ports being normally closed by means of valves 48 carried by a shiftable ring shaped member 47 fitting within the cylindrical wall of the chamber 38. A conical coil spring 49 is mounted between the member 47 and a seat 50 secured to an adjusting screw 51. The spring 49 acts as a regulator for the exhaust valves 48 and by adjusting the screw 51 the tension of the spring may be regulated. It will be noted that the springs 43 are housed between the retainers 44 and shoulders 48$^a$ of the exhaust valve member 47, so that in order to open the valve 48 as shown in Fig. 1 it is necessary to compress both springs 43 and spring 49.

In the operation of the present improved mechanism the cylinders 14 and 15 are preferably filled with glycerine, although of course any other suitable oil or liquid may be used where satisfactory. Since the arm or link 36 is connected to the axle of the vehicle and the cylinders are connected to the chassis of the vehicle, it will be seen that when the arm 36 is shifted upwardly by the upward movement of the axle which places the vehicle springs under tension, the piston 22 will be shifted downwardly in its cylinder during the upward movement of the piston 24 in cylinder 15. This downward stroke of the piston 22 positively forces the valve 40 open against the tension of springs 43, thus filling the cylinder 15 with glycerine during the return stroke of the piston 24. Upon the recoil of the vehicle springs the arm 36 will be shifted downwardly. The valve 40 however closes and the glycerine is gradually forced out of the cylinder 15 through the smaller exhaust ports 46. Greater resistance to the downward stroke of the piston 24 is thus offered than the downward stroke of the piston 22, due to the fact that the springs 43 and 49 must be compressed in order to open the valves 48 and the fluid must be exhausted through the small ports 46. In this manner the rebound or recoil of the vehicle springs is checked and gradually absorbed, thus safeguarding the springs and adding comfort to the riding qualities of the machine.

It will be seen that on the return stroke of piston 24 the piston 22 forces the fluid through the passage 18 in the direction of the arrow and through the valve 40, it being necessary to overcome the tension of springs 43 in order to open valve 40. On the downward stroke of piston 24 it is necessary to overcome the tension not only of springs 43 but of spring 49 and the fluid can only be exhaused gradually through the ports 46 and thence through the central opening in the valve member 47 into the cylinder 14.

The piston 22 is also provided with an automatic valve mechanism adapted for the purpose of regulating the amount of fluid or glycerine in the cylinders 14 and 15. A bushing 52 is screwed into the lower portion of the piston 22 and is provided with ports or ducts 53 which are normally closed by means of a spring controlled valve 54. The cylinders 14 and 15 are filled with glycerine at their upper ends so as to permit the wrist pins 26 and 30 to be under constant lubrication. If for any reason there is not sufficient glycerine or fluid below the pistons 22 and 24 in the cylinders due for instance, to the leakage of fluid by the rings 23 or 25, a vacuum would occur in the cylinder 14 on the upstroke of the piston 22. This would cause the automatic regulating valve 54 to open thereby permiting fluid to flow through the ports 53 into the lower parts of the cylinders. Any leakage of fluid past the piston rings 25 would eventually cause the cylinder 15 to overflow upon the upstroke of piston 24, which would lift the fluid over the wall 16 through the passage 18$^a$ beneath the shaft 33, into the hollow piston 22, which fluid would pass into the cylinder 14 upon the automatic operation of valve 54. Thus it will be seen that the pistons 22 and 24 act against the same body of fluid or glycerine at all times, the valve mechanism offering greater resistance to the working stroke of one piston than the other piston thereby cushioning or absorbing the rebound or recoil of the vehicle springs and checking all shocks or vibrations.

It is to be understood that by describing in detail herein any particular form, structure, or arrangement, it is not intended to limit the invention beyond the terms of the several claims or the requirements of the prior art.

Having thus explained the nature of my said invention and described a way of constructing and using the same, although without attempting to set forth all of the forms in which it may be made, or all of the modes of its use, I claim:

1. In a shock absorber the combination of a casing having a pair of fluid containing cylinders, a pair of pistons operating therein, each piston acting at one stroke thereof to force fluid from its cylinder into the other cylinder, and a pair of valve means for resisting such action.

2. In a shock absorber the combination of a casing having a pair of fluid containing cylinders, a pair of pistons operating therein, one of said pistons acting at one stroke to force fluid from its cylinder into the other cylinder during the return stroke of the other piston, and shiftable valve means controlled by one of said pistons.

3. In a shock absorber the combination of a casing having a pair of fluid containing cylinders, and a pair of pistons operating therein, each piston acting at one stroke thereof to force fluid from its cylinder into the other cylinder, and a pair of oppositely working valve means located between said cylinders, one thereof having greater resistance to the flow of fluid than the other.

4. In a shock absorber the combination of a casing having a pair of fluid containing cylinders, and a pair of pistons operating therein, each piston acting at one stroke thereof to force fluid from its cylinder into the other cylinder and means for connecting said pistons together for simultaneous operation, said means comprising a pivoted rocker member connected to said pistons at opposite sides of the pivot thereof.

5. In a shock absorber the combination of a casing having a pair of cylinders, a pair of pistons operating therein, a rock shaft connected to each piston, means for connecting said shaft and casing to a pair of relatively movable vehicle parts, each of said pistons acting at one stroke to force fluid from its cylinder into the other cylinder, and valve means between said cylinders having greater resistance to the stroke of one piston than the other.

6. In a shock absorber the combination of a pair of fluid containing cylinders, a pair of connected oppositely reciprocating pistons therein, one of said pistons at one stroke thereof forcing fluid from its cylinder into the other cylinder, and valve means adapted to open and close for resisting the flow of fluid.

7. In a shock absorber a casing having a pair of fluid containing cylinders, pistons operating in said cylinders and working against the same body of fluid, valve mechanism between the cylinders and adapted to offer greater resistance to the working stroke of one piston than the other, and valve mechanism for regulating the volume of fluid against which said pistons work.

8. In a shock absorber the combination of a pair of fluid containing cylinders, a pair of pistons therein operating simultaneously in different directions against the same body of fluid, valve mechanism between said cylinders for permitting the flow of fluid from one cylinder to the other, said mechanism comprising a pair of valve members and a pair of resilient means therefor, one of the valve members being controlled by one resilient means and the other valve member by both resilient means.

9. In a shock absorber the combination of a pair of fluid containing cylinders, a pair of pistons therein operating simultaneously in different directions against the same body of fluid, valve mechanism between the said cylinders for permitting the flow of fluid from one cylinder to the other, said mechanism comprising a relatively large inlet valve and a relatively small exhaust valve.

10. In a shock absorber the combination of a pair of fluid containing cylinders, a pair of connected pistons therein operating simultaneously in different directions, valve mechanism between said cylinders for permitting one piston to force fluid from its cylinder into the other cylinder, and valve mechanism between the cylinders for permitting said last piston to force such fluid back into the other cylinder, and means for connecting said cylinders and pistons to relatively movable parts of a vehicle.

11. In a shock absorber a fluid containing chamber having a partition terminating short of a pair of opposite sides thereof and forming a pair of cylinders, pistons working in said cylinders, each piston operating to force fluid from one cylinder into the other at one end of said partition, a pair of valve mechanisms for variably resisting such flow of fluid, and valve mechanism for permitting the abnormal flow of fluid from one cylinder into the other at the opposite end of said partition.

12. In a shock absorber a fluid containing chamber having a partition terminating short of a pair of opposite sides thereof and forming a pair of cylinders, connected pistons working in said cylinders, each piston operating to force fluid from one cylinder into the other at one end of said partition, a pair of valve mechanisms for variably resisting such flow of fluid, and valve mechanism for permitting the abnormal flow of fluid from one cylinder into the other at the opposite end of said partition.

13. In a shock absorber a fluid containing chamber having a partition terminating short of a pair of opposite sides thereof and forming a pair of cylinders, connected pistons working in said cylinders, each piston operating to force fluid from one cylinder into the other at one end of said partition, a pair of valve mechanisms for variably resisting such flow of fluid, and valve-mechanism carried by one of said pistons for permitting the abnormal flow of fluid from one cylinder into the other at the opposite end of said partition.

14. In a shock absorber the combination of a fluid containing cylinder and a piston therein, said cylinder and piston adapted to be connected to a pair of relatively movable vehicle parts, a reciprocating piston operative to force fluid into said cylinder at the return stroke of the piston therein, and means for variably resisting the operation of said pistons.

15. In a shock absorber the combination of a fluid containing cylinder and a piston therein, said cylinder and piston adapted to be connected to a pair of relatively movable vehicle parts, a reciprocating piston connected to said first piston and operative simultaneously therewith for forcing fluid into said cylinder during the return stroke of the piston therein, and shiftable valve means controlled by said reciprocating piston.

16. In a shock absorber the combination of a pair of fluid containing cylinders, a pair of pistons operating in said cylinders, means for connecting said cylinders so that one of said pistons will operate to force fluid into the other cylinder during the return stroke of the piston therein, and spring controlled valve means located between said cylinders.

17. In a shock absorber the combination of a pair of fluid containing cylinders, a pair of pistons operating in said cylinders, and intake and exhaust valve mechanism between said cylinders and constructed to permit one of said pistons at a predetermined stroke thereof to force fluid into the other cylinder at a predetermined stroke of the piston therein.

18. In a shock absorber the combination of a casing having a pair of fluid containing cylinders, a pair of pistons in said cylinders, a rocker arm connecting said pistons together, a rock shaft connected to said rocker arm, means for connecting said shaft to a body member, means for connecting the casing to a body member movable relatively to said member, each of said pistons operating at one stroke to force fluid into the other cylinder, and valve means for variably resisting such flow of fluid.

19. In a shock absorber the combination of a casing having a pair of fluid containing cylinders, a pair of pistons in said cylinders, a rocker arm connecting said pistons together, a rock shaft connected to said rocker arm, means for connecting said shaft to a body member, means for connecting the casing to a body member movable relatively to said member, each of said pistons operating during one stroke to force fluid into the other cylinder, valve means for variably resisting such flow of fluid, and valve means carried by a piston for regulating the amount of fluid in said cylinders.

20. In a shock absorber the combination of a pair of communicating fluid carrying cylinders, a pair of pistons working in said cylinders against the same body of fluid, and valve mechanism between said cylinders adapted to offer greater resistance to the working stroke of one piston than the other piston.

21. In a shock absorber, the combination of a pair of fluid containing chambers, a pair of pistons operating therein, means for reciprocating said pistons and including a piston rod pivotally connected to each piston, each of said pistons acting at one stroke thereof to force fluid from its chamber into the other chamber.

Signed at Franklin, New Hampshire, this 25th day of January, 1923.

EDGAR H. WHEELER.